United States Patent [19]

Ogiwara et al.

[11] 4,020,761

[45] May 3, 1977

[54] PLANOGRAPHIC DRY OFFSET MASTER PLATE

[75] Inventors: Makoto Ogiwara; Kenichi Tanaka; Yukio Kojima; Kohichi Nakamura, all of Shizuoka; Yuji Harazaki, Tokyo; Minoru Takamizawa, Annaka; Yoshio Inoue, Annaka; Toshikazu Sugita, Annaka, all of Japan

[73] Assignees: Tomoegawa Paper Co., Ltd.; Shin-Etsu Chemical Industry Co., Ltd., Tokyo, Japan

[22] Filed: Dec. 24, 1975

[21] Appl. No.: 644,019

[30] Foreign Application Priority Data

Dec. 24, 1974 Japan .............................. 49-1706

[52] U.S. Cl. .............................. 101/457; 101/462; 428/446; 428/447; 428/448; 428/452; 428/908

[51] Int. Cl.[2] ...................... B41N 1/12; B32B 9/04

[58] Field of Search .......... 428/446, 447, 908, 909, 428/452, 448; 260/825; 101/457, 462

[56] References Cited

UNITED STATES PATENTS

| | | | |
|---|---|---|---|
| 3,209,683 | 10/1965 | Greubel | 101/457 |
| 3,241,486 | 3/1966 | Greubel | 101/457 |
| 3,328,481 | 6/1967 | Vincent | 428/447 |
| 3,455,732 | 7/1969 | Hathaway | 428/447 |
| 3,505,099 | 4/1970 | Newroth | 428/447 |
| 3,511,178 | 5/1970 | Curtin | 101/457 |
| 3,606,922 | 9/1971 | Doggett | 101/462 |
| 3,623,942 | 11/1971 | Yerrick | 428/447 |
| 3,627,851 | 12/1971 | Brady | 428/447 |
| 3,631,220 | 12/1971 | Wojdac | 428/447 |
| 3,667,996 | 6/1972 | Antonen | 428/447 |

*Primary Examiner*—Ellis P. Robinson
*Attorney, Agent, or Firm*—Sughrue, Rothwell, Mion, Zinn & Macpeak

[57] ABSTRACT

A planographic dry offset master plate composed of a substrate and, formed thereon, a crosslinking agent-cured layer of a diorganopolysiloxane in which 5 to 40 mole % of the organic groups directly bonded to silicon atoms are phenyl groups. The master plate is especially suitable for plate-making by an electrostatic process and a direct image process. The resulting printing plate has good durability and are free from scumming during printing.

19 Claims, No Drawings

PLANOGRAPHIC DRY OFFSET MASTER PLATE

BACKGROUND OF THE INVENTION

1. FIELD OF THE INVENTION

This invention relates to a planographic master plate which can be used for offset printing wihtout using dampening water.

2. DESCRIPTION OF THE PRIOR ART

As is well known, conventional planographic printing plates consist of an image area (oleophilic portion) which is hard to wet with water and which receives only printing ink, and a non-image area (hydrophilic portion) which is easily wetted with water but repels printing ink, both of which areas are on the same surface of a plate-making substrate. In such planographic plates, the non-image area is rendered hydrophilic by etching and the ink repellency thereof is maintained by applying dampening water thereto during printing. Because of the use of dampening water, these planographic master plates have various defects, among which are:

1. The ink is liable to be emulsified.
2. Drying of the ink is slow.
3. The printed colors and gloss worsen with time,
4. The durability of the plate in printing is insufficient.
5. A complicated printing press must be used.
6. Because of the etching treatment required, plate making is complicated.

In an attempt to remedy these defects of planographic master plates, recently developed planographic printing methods do not require dampening water or an etching treatment as a result of utilizing the superior ink-repelling property of silicones. However, these planographic master plates which do not require dampening water have not found a wide range of applicability, as they depend on the method of plate-making and processes for making such plates is limited. For example, when an ink-receptive image area is formed on such a master plate by an electrophotographic plate-making process or by a direct image process involving direct writing or drawing by, for example, a typewriter, both of which processes have recently gained widespread acceptance in the printing industry as simple plate-making techniques, the toner image or direct writing images cannot be firmly bonded to the silicone layer, and, therefore, the resulting printing plate has poor durability in printing.

SUMMARY OF THE INVENTION

It is an object of this invention, therefore, to provide a planographic dry offset master plate which permits an electrophotographic or direct image plate-making process to be used as a result of selecting a specific silicone material.

According to this invention, there is provided a planographic dry offset master plate for an electrophotographic process (see U.S. Pat. No. 2,297,691) or a direct image process (see U.S. Pat. No. 2,907,674) which is composed of a substrate and, formed thereon, a cured layer of a silicone rubber composition comprising a diorganopolysiloxane, in which from 5 to 40 mole% of the organic groups directly bonded to the silicon atoms in the diorganopolysiloxane are phenyl groups, and a cross-linking agent (such a layer is hereafter often referred to as a silicone material or silicone rubber layer, for purposes of brevity).

DETAILED DESCRIPTION OF THE INVENTION

Planographic dry offset master plates using a silicone material operate on the following principle. To the non-image areas of the plate the ink of an inking roller does not transfer because of the ink-repelling property of the silicone rubber. On the other hand, the image areas accept ink from an inking roller as a result of being formed of an ink-receptive material.

Accordingly, such a coating of silicone material, after being cured by heating, is generally required to have the following characteristics:

1. It should be free from scumming; in other words, it should be sufficiently repellent to ink.

2. It should have sufficient durability in printing; in other words, the image-forming material on the image areas should have sufficiently durable bonding to the silicone material.

For an electrophotographic plate-making process, firm adhesion of the toner to the surface of the silicone coating is especially required.

We tested various silicon materials commercially available, and found that silicone rubbers of a superior ink-repellent property has a very weak bonding strength to the image-forming material and give master plates having very low durability, while, on the other hand, silicone rubbers having good bonding strength to the image forming material give master plates in which scumming occurs on the surface of the silicone coating at the time of the printing.

We therefore made further investigations in order to develop silicone materials having a superior ink-repellent property and a high bonding strength to image-forming materials. Our investigations finally led to the discovery that a product obtained by coating a substrate with a curable silicone rubber coating solution consisting mainly of a diorganopolysiloxane in which 5 to 40 mole % of the organic groups directly bonded to the silicon atoms are phenyl groups, and curing the resulting layer by heating, exhibits very good ink repellency, and when an image area was formed thereon, the bonding strength between the silicone rubber layer and the image-forming material was so superior that we could find no equal in conventional planographic master plates, i.e., we had markedly increased plate durability for printing.

In the silicone material art, the size of the diorganopolysiloxane molecules is usally expressed by the viscosity of the silicone concerned. In the present invention, the viscosity of the diorganopolysiloxanes is greater than about 100,000 centistokes at 25° C, preferably higher than 500,000 centistokes at 25° C. The diorganopolysiloxanes employed as a component of the silicone rubber compositions most conveniently have a viscosity higher than 1,000,000 centistokes at 25° C, and no adverse effects are brought about by the use of diorganopolysiloxanes with the highest viscosity practically available, i.e., there is no critical upper limit on the viscosity of the diorganopolysiloxanes. The maximum viscosity of commercially available diorganopolysiloxanes is several million centistokes at 25° C, and the higher the viscosity, the better the results due to the improved mechanical strength of the cured silicone rubber layer. On the other hand, viscosities lower than above result in insufficient mechanical strength of the cured silicone rubber layer.

The characteristic feature of this invention is that it provides superior printing charcteristics not obtainable by conventional techniques in plate-making by an electrophotographic process or a direct image process.

According to this invention, the image-forming materials, i.e., a toner in the electrophotographic process or the writing materials, e.g., pencil graphite or typewriter ribbon ink in the direct image process, can be firmly bonded to the silicone rubber coating without breaking the coating when an ink-receptive image area is formed on the master plate. In addition, the silicone rubber coating has superior ink repellency and is free from scumming.

The electrophotographic plate-making processes applicable to the planographic master plate of this invention can be classified into two methods; one is a xerographic method where a toner image is transferred to the surface of the silicone rubber coating (see U.S. Pat. No. 2,297,691) and the other is an Electrofax method where a silicone rubber layer is formed on an electrophotographic sensitive layer, or an electrophotographic sensitive layer having incorporated therein a silicone rubber is prepared, and a series of charging-exposing-developing-fixings are directly carried out (see U.S. Pat. No. 2,907,674).

Direct image processes are also applicable to the planographic master plate of this invention. In such processes an image is directly formed on the surface of a silicone rubber layer by means of, say, a typewriter, and this image-forming material is bonded to the surface of the silicone rubber layer (see U.S. Pat. No. 2,532,865).

The toner used as an image-forming material in the electrophotographic process may be either a dry toner or a wet toner (thus, both dry and wet plate-making methods are possible, see, for example, U.S. Pat. Nos. 2,297,691 and 2,907,674) and includes any toner material that is thermofusible, preferably at 80° to 130° C, and oleophilic. Preferably, the toner is mainly composed of a resin having a high bonding strength to the silicone rubber compositions in accordance with this invention (such as polystyrene, epoxy, rosin-modified phenol, silicone or ethylene/vinyl acetate copolymer resins), usually with a pigment, a dye and several other conventional auxiliary additives; see U.S. Pat. Nos. 2,618,551 and 2,907,674 for typically used toners.

The image-forming material for the direct image process may be any material which is oleophilic and ink-receptive, such as the inks for conventional carbon ribbons or carbon papers and a ball-point pen ink composed mainly of an oil dye. Greater effects can be obtained with those materials containing an acrylic, vinyl chloride/vinyl acetate copolymer, polystyrene, epoxy, silicone, rosin-modified phenol, or nitrocellulose resin, all of which have high bonding strength to the silicone materials.

The substrate which is coated with the silicone material is not particularly limited but must be one which has adhesiveness to and does not absorb or imbibe the silicone material, for example, a polyvinyl alcohol-coated paper, a synthetic resin-laminated paper, or a plastic film.

In addition to an electrophotographic process and a direct image process, the master plates of this invention can be used in other plate-making techniques such as a discharge recording method, an electrostatic recording method and a method using a diazo sensitizing agent.

The silicone material used in this invention will now be described in detail.

The diorganopolysiloxane used in this invention can have a linear, branched or cyclic molecular configuration and from 5 to 40 mole%, preferably, from 10 to 30 mole%, of the organic groups contained therein directly bonded to the silicon atoms are phenyl groups, the remainder of such directly bonded groups being methyl groups, where, optionally, vinyl groups can comprise up to 5 mole% of such silicon bonded organic groups. When vinyl groups are present, generally at least two such groups are present in the diorganopolysiloxane molecule. Hereafter, for purposes of identifying such diorganopolysiloxanes in brief fashion it is not always stated that such organic groups are directly bonded to a silicon atom; this should be understood, however.

A cross-linking agent for the hydroxy terminated diorganopolysiloxanes is mixed therewith. The cross-linking agent has at least two functional groups in its molecule capable of forming cross-linkages by a condensation reaction with the terminal hydroxy groups. The cross-linking reaction by which the phenyl-containing diorganopolysiloxane is cured may be any condensation reaction including a dehydration condensation between the silanolic hydroxy groups of the diorganopolysilioxane, a dehydrogenation, a dealcoholation or a decarboxylation between a silanolic hydroxy group and an Si-H, Si-alkoxy or Si-acyloxy group, respectively, in an organopolysiloxane or an organosilane as a cross-linking agent, the alkoxy or acyloxy groups having 1 to 4 carbon atoms, or an addition reaction between a vinyl group in the diorganopolysiloxane and an Si-H group in an organohydrogenpolysiloxane as a cross-linking agent.

In order to obtain best adhesion of the coating layer of the diorganopolysiloxane composition to the substrate material as well as satisfactory durability in printing and repellency of printing ink of the cured layer of the diorganopolysiloxane, preferred combinations include the phenyl-containing diorganopolysiloxane (1), a crosslinking agent (2) and an optional catalyst (3): [A]

1. A linear diorganopolysiloxane terminated at both chain ends by hydroxy groups directly bonded to the terminal silicon atoms and composed of $(CH_3)_2SiO$, $(C_6H_5)_2SiO$ and/or $(C_6H_5)(CH_3)SiO$ units, of which from 5 to 40 mole% of the organic groups are phenyl groups, having a viscosity greater than 500,000 centistokes at 25° C, or a methylphenylpolysiloxane with a block structure composed of blocks of $(CH_3)_2SiO$ units and blocks of $(C_6H_5)SiO_{1.5}$, $(C_6H_5)(CH_3)SiO$ and/or $(C_6H_5)$ SiO units, of which from 5 to 40 mole% of the organic groups are phenyl groups, having a viscosity larger than 500,000 centistokes at 25° C. 2. A methylhydrogenpolysiloxane having at least 2 hydrogen atoms directly bonded to the silicon atoms in a molecule composed of $CH_3HSiO$ and/or $(CH_3)_2HSiO_{0.5}$ units or of a combination of $CH_3HSiO$ and/or $(CH_3)_2HSiO_{0.5}$ units with $(CH_3)_2SiO$ and/or $(CH_3)_3SiO_{0.5}$ units, or a silane or a polysiloxane having at least 2 hydroxy, alkoxy or acyloxy groups in the molecule, e.g., methyltriethoxysilane and methyltriacetoxysilane, and the partial hydrolysiscondensation products of such silanes. Such materials are terminated at both chain ends with monofunctional groups, i.e., either trimethylsilyl groups —$SiMe_3$ or dimethylhydrogensilyl groups —$SiHMe_2$. Useful copolymers include methylhydrogenpolysiloxanes where the main chain is composed of methylhydrogensiloxane units and dimethylsiloxane units. While organopolysiloxanes with alkoxy groups very suitable, the organopolysiloxanes with acyloxy groups, for example, acetoxy groups, are not always preferred because acetic acid, which has a bad odor and is rust-inducing, is produced by a condensation reaction with silanolic OH groups.

3. A conventional condensation catalyst such as an organic amine (such as triethylamine, triethanolamine, aniline, pyridine) or an organometallic compound, e.g., an organotin compound (such as dibutyltin diacetate, dibutyltin dilaurate and dibutyltin dioctoate), and organozinc compound (such as zine dioctoate and zinc dinaphthenate), or an organotitanium compond (such as tetramethyltitanate, tetraethyltitanate, tetra(i-propyl)titanate and tetra(n-butyl)titanate). The condensation catalyst is generally employed in an amount not exceeding 5% by weight based on the weight of component [A](1).

[B]

1. A linear diorganopolysiloxane terminated at both chain ends with triorganosilyl groups and composed mainly of $(CH_3)$—$_2SiO$, $(CH_3)_3SiO_{0.5}$, $(C_6H_5)_2SiO$ and-/or $(C_6H_5)(CH_3)SiO$ units, having at least two vinyl groups in the molecule in the form of $(CH_2{=}CH)(CH_3)SiO$ and/or $(CH_2{=}CH)(CH_3)_2SiO_{0.5}$ units, of which from 5 to 40 mole% of the organic groups are phenyl groups, with a viscosity greater than 500,000 centistokes at 25° C, or a triorganosilylterminated diorganopolysiloxane with a block structure composed of blocks of $(CH_2{=}CH)(CH_3)SiO$ and/or $(CH_3)_2SiO$ units and blocks of $C_6H_5SiO_{1.5}$, $(C_6H_5)(CH_3(SiO$ and/or $(C_6H_5)_2SiO$ units, having at least two vinyl groups in the molecule in the form of $(CH_2{=}CH)(CH_3)SiO$ and/or $(CH_2{=}CH)(CH_3)_2SiO_{0.5}$ units, with a viscosity greater than 500,000 centistokes at 25° C, of which from 5 to 40 mole% of the organic groups are phenyl groups.

2. A crosslinking agent as described in [A](2), e.g., methylhydrogenpolysiloxane which is a homopolymer or a copolymer containing at least two ≡ Si-H groups per molecule and composed of $(CH_3)_2SiO$ units, $(CH_3)HSiO$ units, $(CH_3)\ _3SiO_{0.5}$ units and/or $(CH_3)_2HSiO_{0.5}$ units.

3. A conventional platinum-type addition reaction catalyst such as chloroplatinic acid, chloroplatinic acid modified with an alcohol such as ethanol or isopropyl alcohol and complexes of chloroplatinic acid with olefins such as ethylene and propylene. The amount of the platinum catalyst employed is not critical and merely establishes the desired reaction velocity; it is usually in the range from 1 to 100 ppm by weight as platinum based on the weight of the organopolysiloxanes (Components (B)(1) and (B)(2)) to be cross-linked by the catalytic action of the catalyst.

The diorganopolysiloxanes used as cross-linking agents for the hydroxy-terminated diorganopolysiloxanes are usually employed in an amount of a few %, generally 10% at most, by weight based on the diorganopolysiloxane to be cross-linked.

The molecular weight of the methylhydrogenpolysiloxane as a cross-linking agent is not of great importance. Methylhydrogenpolysiloxane with a viscosity higher than several hundred or 1,000 centistokes at 25° C are not easily commercially available.

Each of such compositions is dissolved in an organic solvent such as aromatic and aliphatic hydrocarbons, esters and ketones. The resulting solution is coated on the substrate, dried and cured to form a master plate.

The conditions for drying and curing are not critical but a temperature as high as possible is desirable insofar as no undesirable effects are brought about on the properties of the substrate material which is, in most cases in the present invention, paper. It is the usual practice that a substrate paper coated with a silicone composition is kept at a temperature around 100° to 200° C for several minutes or less.

In order to increase the durability of the plate by improving the mechanical strength of the silicone rubber layer and the bonding strength of the silicone rubber layer to the toner, it is possible to incorporate in the silicone rubber coating solution a finely divided silica filler such as silica aerogel, for example, Aerosil 200, manufactured by DEGUSSA, West Germany, silica hydrogel and finely pulverized quartz or fuzed quartz with a particle size distribution smaller than 100 nm in an amount up to 50%, preferably up to 20%, by weight based on the weight of the diorganopolysiloxane, or a silane containing a carbon functional group such as a vinyl, glycidyl, methacryloxy, amino or mercapto group or a partially hydrolyzed product thereof, e.g., vinyltriethoxysilane, 3-glycidoxypropyltrimethoxysilane, 3-methacryloxypropyltrimethoxysilane, 3-aminopropyltriethoxysilane, 3-mercaptopropyltrimethoxysilane and partial hydrolyzates thereof.

The following Examples specifically illustrate the present invention without limiting the same. Unless otherwise indicated, all thicknesses were dry thicknesses, and when not specified, the terminal groups were triorganosilyl groups, typically trimethylsilyl groups, and all parts and ppm are by weight.

EXAMPLE 1

In order to impart solvent resistance thereto, high quality paper having a basis weight of 120 g/m² was coated with polyvinyl alcohol (Kuraray PVA 117, $\bar{p}$ = 1750, saponification degree = 85%) so that the amount thereof after drying was 2 g/m². A silicone rubber composition composed of a diphenyldimethylpolysiloxane random polymer having terminal silanol groups and containing 0 to 60 mole% of phenyl groups the balance being methyl groups, as shown in Table 1 (viscosity of 500,000 to 700,000 centistokes at 25°), 1 part per 100 parts of diphenyldimethylpolysiloxane, of a silicone fluid composed of methylhydrogenpolysiloxane having a viscosity at 25° C of 30 centistokes as a cross-linking agent and 1 part per 100 parts of the diphenyldimethylpolysiloxane, of dibutyltin diacetate as a catalyst were dissolved in toluene to a solids concentration of 10%. The resulting siloxane coating solution was coated on the surface of the polyvinyl alcohol-coated paper to a dry thickness of 5 μm and simultaneously dried and cured at 150° C for minute to make a dry offset master plate.

A toner image was formed on the surface of the master plate using a toner composed mainly of an epoxy resin (Toko Toner, product of Tomoegawa Paper Co., Japan) by means of a xerographic copying machine (ES-X-10, a product of Tokyo Aircraft Instrument Co.), and thermofixed under the fixing conditions shown in Table 1 to form a printing plate. The plate was mounted on a small-sized offset printing press (A. B. DICK 320, a product of A. B. DICK Company), and a printing test performed.

The durability and the degree of scumming of the plates were determined, and the results are shown in Table 1.

Table 1

| | Characteristics | Durability | | | | | |
|---|---|---|---|---|---|---|---|
| | Phenyl | Fixing conditions | | | | | |
| Run No. | group content (mole %) | 100° C, 30 sec. | 100° C, 60 sec. | 120° C, 60 sec. | 140° C, 60 sec. | 150° C, 60 sec. | Degree of scumming |
| 1 | 0 | X | X | X | X | X | ⊙ |
| 2 | 1* | X | X | X | Δ | Δ | ⊙ |
| 3 | 5* | X | X | Δ | ○ | ○ | ⊙ |
| 4 | 10 | Δ | Δ | ○ | ⊙ | ⊙ | ⊙ |
| 5 | 20 | ○ | ⊙ | ⊙ | ⊙ | ⊙ | ⊙ |
| 6 | 30 | ⊙ | ⊙ | ⊙ | ⊙ | ⊙ | ○ |
| 7 | 40 | ⊙ | ⊙ | ⊙ | ⊙ | ⊙ | Δ |
| 8 | 50 | ⊙ | ⊙ | ⊙ | ⊙ | ⊙ | X |
| 9 | 60 | ⊙ | ⊙ | ⊙ | ⊙ | ⊙ | X |

*The results of the durability tests are seen to differ between a 5% and a 1% phenyl content; see the columns with the fixing temperature of 140 or 150° C. A durability of 100 copies is border line.

Durability and scumming were evaluated on the following scales.

1) Durability
- ⊙: more than 1,000 copies could be printed
- ○: 100 to 1,000 copies could be printed
- Δ : 10 to 10 copies could be printed
- X : less than 10 copies could be printed 2) Scumming
- ⊙ : no scumming
- ○ : some scumming, but without practical drawbacks for use
- Δ : slight scumming occurred, but not overly detrimental to practical use
- X : scumming was so heavy as to cause trouble in practical use The results shown in Table 1 demonstrate that with the master plate free of phenyl groups it was impossible to obtain sufficient durability even when all normal fixing conditions were used, whereas with the master plates of this invention prepared with a phenyl-containing siloxane, the durability increased with increasing phenyl group content. On the other hand, scumming did not at all occur when the amount of phenyl groups was less than 20 mole%. When the amount was above 30 mole%, some scumming occurred but not to a degree to be a practical drawback. Scumming was not detrimental to practical use of the plate if the amount of the phenyl groups was less than 40 mole%.

These data led to the conclusion that the phenyl group content in the silicone rubber which is most suitable for obtaining characteristics satisfactory for planographic master plates is 5 to 40 mole%, or more preferably, 10 to 30 mole%.

The improvement of printing characteristics brought about as a result of introducing phenyl groups into silicone rubber is acscribable to increased bonding strength between the surface of the phenyl-containing silicone rubber and the electrophotographic toner. Although the theoretical grounds therefore have not been clearly established, it is at least certain that the increase in bonding strength is due to the nature of the phenyl-containing silicone rubbers.

A printing plate was made using a toner composed mainly of a polystyrene resin on the master plate obtained in this example. The results of the printing test as described were quite the same as those given in Table 1.

EXAMPLE 2

A diphenyldimethylpolysiloxane containing 20 mole% phenyl groups, 0.5 mole% vinyl groups, balance methyl groups, having a viscosity of about 550,000 centistokes at 25° C, 1 part per 100 parts of the diphenyldimethylpolysiloxane of methylhydrogenpolysiloxane having a viscosity at 25° C of 30 centistokes as a cross-linking agent and 20 ppm, as platinum based on the diphenyldimethylpolysiloxane, of a chloroplatinic acid-alcohol complex catalyst (prepared by dissolving chloroplatinic acid in n-butanol in a concentration of 2% by weight as platinum) were dissolved in toluene to form a silicone rubber solution of a solids concentration of 10%. The resulting coating solution was coated on the surface of a polyethylene-laminated paper (polyethylene 20 μm thick) having a basis weight of 90 g/m² as a substrate to a dry thickness of 5 μm, and simultaneously dried and cured at 120° C for 1 minute to make a dry offset master plate.

An image was formed on the surface of the master plate by either: (1) a process which comprised forming a toner image using a toner as in Example 3 by means of a xerographic copying machine (ES-X-10) as in Example 1 and thermofixing at 120° C for 60 seconds; or (2) a process which comprised forming an image by directly typewriting on the diphenyldimethylpolysiloxane containing layer using a carbon ribbon on an electric typewriter.

These printing plates were subjected to the same printing test as set forth in Example 1. In both cases, more than 1,000 copies could be printed, and no scumming occurred.

EXAMPLE 3

A block copolymer of phenylmethylpolysiloxane containing 10 mole% of phenyl groups, balance methyl groups, and composed of blocks of $C_6H_5SiO_{1.5}$ units and blocks of $(CH_3)_2SiO$ units and having a viscosity of about 800,000 centistokes at 25° C, 1 part per 100 parts of the block copolymer, of methylhydrogenpolysiloxane having a viscosity at 25° C of 30 centistokes as a cross-linking agent and 0.5 part per 100 parts of the block copolymer, of dibutyltin dioctoate as a catalyst were dissolved in toluene to form a solution of the silicone rubber of a solids concentration of 10%. Then, 1 part of a silane coupling agent $[H_2NC_2H_4NHC_3H_6Si(OCH_3)_3]$ was added to the solution to form a coating solution. The coating solution was coated on a polyethylene-laminated paper (polyethylene 20 μm thick) having a basis weight of 90 $g/m^2$ to a dry thickness of 5 μm, and simultaneously dried and cured at 150° C for 1 minute to make a dry offset master plate.

A toner image was formed on the surface of the master plate using a 10 to 50 μm toner composed mainly of 40 wt% polystyrene resin, 40 wt% silicone resin, and 20 wt% carbon black and a small amount of a dye by means of a xerographic copying machine (ES-X-10), and thermofixed at 120° C for 60 seconds. Then, the printing plate was subjected to the same printing test as set forth in Example 1. More than 1,000 copies could be printed, and no scumming occurred.

EXAMPLE 4

One hundred parts of phenylmethylpolysiloxane terminated at both chain ends with hydroxy groups directly bonded to the silicon atoms, of which 20 mole% of the organic groups were phenyl groups, balance methyl groups, and having a viscosity of about 1,000,000 centistokes at 25° C, 1 part of methylhydrogenpolysiloxane fluid having a viscosity of about 30 centistokes at 25° C as a cross-linking agent and 0.5 part of dibutyltin diacetate as a catalyst were dissolved in n-hexane at a solids concentration of 10%. The resulting solution was coated on the photosensitive layer-bearing surface of an electrophotographic master paper (Ricohfax Master Long-Run, a product of Ricoh Co., Ltd. (photosensitive layer composed of 80% by weight of ZnO and 20% by weight of an acrylic resin as a binder with a small amount of a photosensitizing dye)) at a rate of 1.0 $g/m^2$ (as solids), and simultaneously dried and cured at 160° C for 1 minute to make a master plate.

A toner image was formed on the surface of the master plate using a toner as in Example 1 by means of an electrofaxtype electrophotographic plate-making machine (Elefax PC-301, a product of Iwatsu Electric Co., Ltd.), and thermofixed at 120° C for 60 seconds. The printing plate was subjected to the same printing test as set forth in Example 1. More than 1,000 copies could be printed, and no scumming occurred.

EXAMPLE 5

One hundred parts of methylphenylpolysiloxane with a block structure similar to the siloxane employed in Example 3, of which 20 mole % of the organic groups were phenyl groups, balance methyl groups, and having a viscosity of about 1,000,000 centistokes at 25° C, 1 part of a methylhydrogenpolysiloxane fluid having a viscosity of 30 centistokes at 25° C as a cross-linking agent, 1 part of dibutyltin dilaurate as a catalyst and 2 parts of silica aerogel (Aerosil 200, trademark by DEGUSSA, West Germany) were dissolved or dispersed in n-hexane to form a solution of a solids concentration of 10%. The resulting solution was coated on the photosensitive layer-bearing surface of an electrophotographic master paper as in Example 4 at a rate of 1.0 $g/m^2$, and simultaneously dried and cured at 160° C for 1 minute to form a master plate.

A toner image was formed on the surface of the master plate using a toner as in Example 1 by means of an electrofaxtype electrophotographic plate-making machine (Elefax PC-301), and thermofixed at 120° C for 60 seconds. The printing plate was subjected to the same printing test as set forth in Example 1. More than 1,000 copies could be printed, and no scumming occurred.

EXAMPLE 6

High quality paper having a basis weight of 90 $g/m^2$ was coated with polyvinyl alcohol (same as in Example 1) and an electroconductive agent (ECR-34, a product of Dow Chemical Co.) so that the amount thereof after drying was 4 $g/m^2$. One hundred parts of diorganopolysiloxane, of which 20 mole % and 1 mole % of the organic groups were phenyl and vinyl groups, respectively, the remainder being methyl groups, and having a viscosity of about 600,000 centistokes at 25° C, 300 parts of zinc oxide with a particle size distribution of 1 to 10 μm, 1 part of methylhydrogenpolysiloxane fluid having a viscosity of 30 centistokes at 25° C as a cross-linking agent, 30 ppm (as platinum, based on all siloxanes) of a platinumethylene complex prepared in a conventional manner (see U.S. Pat. No. 3,159,601) as a catalyst and 0.08 parts of Rose Bengal as a photosensitizing dye were dissolved or dispersed in toluene (20% solids content). The coating solution was coated on the above substrate at a rate of 20 $g/m^2$ (solids content) and simultaneously dried and cured at 120° c for 30 seconds to form a master plate.

A toner image was formed on the surface of the master plate using a toner as in Example 1 by means of an electrofaxtype electrophotographic plate-making machine (Elefax PC-301), and thermofixed at 120° C for 60 seconds. The printing plate was subjected to the same printing test as set forth in Example 1. More than 1,000 copies could be printed, and no scumming occurred.

EXAMPLE 7

One hundred parts of methylphenylpolysiloxane terminated at both chain ends with hydroxy groups directly bonded to the silicon atoms, 15 mole % of the organic groups being phenyl groups and the balance being methyl groups, and having a viscosity of about 800,000 centistokes at 25° C, 3 parts of methylmethoxypolysiloxane as a cross-linking agent (containing 35% by weight of methoxy groups and having a viscosity of 10 centistokes at 25° C), 2 parts of silica aerogel (Aerosil 200) and 1 part of dibutyltin diacetate as a catalyst were dissolved or dispersed in toluene to a solids concentration of 10%. Into 100 parts of the dispersion in toluene obtained as above there was added 2 parts of a silane [$HSCH_2CH_2CH_2Si(OCH_3)_3$] as a coupling agent to form a coating composition, with which a polyethylene-laminated paper (polyethylene = 20 μm thick) weighing 90 $g/m^2$ was coated to a dry thickness of 2 μm followed by simultaneous drying and curing at 150° C for 1 minute to form a master plate.

A toner image was formed on the surface of the master plate using a toner as in Example 2 by means of a xerographic copying machine (ES-X-10), and thermofixed at 120° C for 60 seconds. The printing plate was subjected to the same printing test as set forth in Example 1. More than 1,000 copies could be printed, and no scumming occurred.

As described hereinabove, the present invention makes it possible to obtain superior printing characteristics not obtainable by prior art techniques by coating a curable siloxane solution composed mainly of a phenyl-containing diorganopolysiloxane on a substrate, followed by curing.

While the invention has been described in detail and with reference to specific embodiments thereof, it will be apparent to one skilled in the art that various changes and modifications can be made therein without departing from the spirit and scope thereof.

What is claimed is:

1. A planographic dry offset master plate which is composed of a substrate which has adhesiveness to and does not absorb or imbibe the silicone material and formed continuously thereon a cured layer of silicone rubber comprising a diorganopolysiloxane having a viscosity of at least about 100,000 centistokes at 25° C, in which from 5 to 40 mole% of the organic groups directly bonded to the silicon atoms are phenyl groups, a cross-linking agent having at least two functional groups in its molecule capable of forming cross-linkages between the molecules of said diorganopolysiloxane by a condensation reaction or an addition reaction, and a catalyst.

2. The planographic dry offset master plate as claimed in claim 1, wherein the other organic groups in said diorganopolysiloxane are methyl and vinyl groups.

3. The planographic dry offset master plate as claimed in claim 1, wherein said diorganopolysiloxane is a diorgano-polysiloxane terminated at both chain ends with hydroxy groups directly bonded to silicon atoms.

4. The planographic dry offset master plate as claimed in claim 3, wherein said cross-linking agent is an organohydrogenpolysiloxane.

5. The planographic dry offset master plate as claimed in claim 1, wherein the organic groups consist of from 5 to 40 mole%, based on the total organic groups, of phenyl groups, at least two vinyl groups, and the balance being methyl groups.

6. The planographic dry offset master plate as claimed in claim 5, wherein said cross-linking agent is an organohydrogenpolysiloxane.

7. The planographic dry offset master plate as claimed in claim 1, wherein said substrate is an undercoated paper, a plastic-laminated paper or a plastic film.

8. The planographic dry offset master plate as claimed in claim 1, wherein said cured layer further comprises an inorganic filler.

9. A planographic dry offset master plate for an electrostatic process and a direct image process which is composed of a substrate which has adhesiveness to and does not absorb or imbibe the the silicone material, and formed continuously thereon a cured layer of a silicone rubber comprising a diorganopolysiloxane having a viscosity of at least about 100,000 centistokes at 25° C, in which from 10 to 30 mole% of the organic groups directly bonded to the silicon atoms are phenyl groups, and a cross-linking agent having at least two functional groups in its molecule capable of forming cross-linkages between the molecules of said diorganopolysiloxane by a condensation reaction or an addition reaction, and a catalyst.

10. The planographic dry offset master plate as claimed in claim 1, wherein said diorganopolysiloxane is composed of the diorganosiloxane units selected from the group consisting of $(CH_3)_2SiO$, $(C_6H_5)_2SiO$ and $(C_8H_5)(CH_3)SiO$ units and terminated at both chain ends with hydroxy groups directly bonded to the silicon atoms.

11. The planographic dry offset master plate as claimed in claim 1, wherein said diorganopolysiloxane is a methylphenylpolysiloxane with a block structure composed of blocks of $(CH_3)_2SiO$ units and blocks of the organosiloxane units selected from the group consisting of $(C_6H_5)$ $SiO_{1.5}$, $(C_6H_5)(CH_3)SiO$ and $(C_6H_5)_2SiO$ units and terminated at the chain ends with hydroxy groups directly bonded to the silicon atoms.

12. The planographic dry offset master plate as claimed in claim 1, wherein said diorganopolysiloxane is composed of the organosiloxane units selected from the group consisting of $(CH_3)_2SiO$, $(CH_3)_3SiO_{0.5}$, $(C_6H_5)_2SiO$ and $(C_6H_5)(CH_3)SiO$ units and at least two of the organosiloxane units expressed by the formula $(CH_2{=}CH)(CH_3)SiO$ or $(CH_2{=}CH)(CH_3)_2SiO_{0.5}$.

13. The planographic dry offset master plate as claimed in claim 1, wherein said diorganopolysiloxane is a triorganosilyl-terminated diorganopolysiloxane with a block structure composed of blocks of $(CH_2{=}CH)(CH_3)SiO$ and $(CH_3)_2SiO$ units and blocks of the organosiloxane units selected from the group consisting of $(C_6H_5)SiO_{1.5}$, $(C_6H_5)(CH_3)SiO$ and $(C_6H_5)_2SiO$ units, having at least two vinyl groups in the molecule in the form of $(CH_2{=}CH)(CH_3)SiO$ or $(CH_2{=}CH)(CH_3)_2SiO_{0.5}$ units.

14. The planographic dry offset master plate as claimed in claim 9, wherein said diorganopolysiloxane is composed of the diorganosiloxane units selected from the group consisting of $(CH_3)_2SiO$, $(C_6H_5)_2SiO$ and $(C_6H_5)(CH_3)SiO$ units and terminated at both chain ends with hydroxy groups directly bonded to the silicon atoms.

15. The planographic dry offset master plate as claimed in claim 9, wherein said diorganopolysiloxane is a methylphenylpolysiloxane with a block structure composed of blocks of $(CH_3)_2SiO$ units and blocks of the organosiloxane units selected from the group consisting of $(C_6H_5)SiO_{1.5}$, $(C_6H_5)(CH_3)SiO$ and $(C_6H_5)_2SiO$ units and terminated at the chain ends with hydroxy groups directly bonded to the silicon atoms.

16. The planographic dry offset master plate as claimed in claim 9, wherein said diorganopolysiloxane is composed of the organosiloxane units selected from the group consisting of $(CH_3)_2SiO$, $(CH_3)_3SiO_{0.5}$, $(C_6H_5)_2SiO$ and $(C_6H_5(CH_3)SiO$ units and at least two of the organosiloxane units expressed by the formula $(CH_2{=}CH)(CH_3)SiO$ or $(CH_2{=}CH)(CH_3)_2SiO_{0.5}$.

17. The planographic dry offset master plate as claimed in claim 9, wherein said diorganopolysiloxane is a triorganosilyl-terminated diorganopolysiloxane with a block structure composed of blocks of $(CH_2{=}CH)(CH_3)SiO$ and $(CH_3)_2SiO$ units and blocks of the organosiloxane units selected from the group consisting of $(C_6H_5)SiO_{1.5}$, $(C_6H_5)(CH_3)SiO$ and $(C_6H_5)_2Sio$ units, having at least two vinyl groups in the molecule in the form of $(CH_2{=}CH)(CH_3)SiO$ or $(CH_2{=}CH)(CH_3)_2SiO_{0.5}$ units.

18. The planographic dry offset master plate as claimed in claim 1, having a toner image formed on the diorganopolysiloxane surface.

19. The planographic dry offset master plate as claimed in claim 1, wherein the diorganopolysiloxane has essentially linear molecular configuration.

* * * * *